Nov. 12, 1935.  H. W. SCHWARTZ  2,020,337

HOLLOW METAL DOOR

Filed Feb. 8, 1934

H. W. Schwartz
INVENTOR

Patented Nov. 12, 1935

2,020,337

UNITED STATES PATENT OFFICE 2,020,337

HOLLOW METAL DOOR

Howard W. Schwartz, New York, N. Y.

Application February 8, 1934, Serial No. 710,267

8 Claims. (Cl. 189—46)

This invention relates to hollow metal door constructions and more particularly to flush type hollow metal door constructions.

One object of this invention is to provide a strong construction that will hold rigid under extreme operating stresses such as are usual to high speed power operation.

Another object of this invention is to provide a simple door construction which is adaptable to be spot-welded through its entire thickness after assembly.

Another object of this invention is to permit the use of flat electrodes in the spot welding machine and cause the outside surfaces of the sheet to remain flat and true without depressions or raised blisters on the surfaces.

Another object of this invention is to reduce the amount of gas or arc welding to a minimum and so eliminate most of the distortion caused by such welding.

Other objects of this invention include the novel features and details of construction of the various parts and combinations of parts disclosed in this application.

The above and other objects will appear from the following description, appended claims and accompanying drawing forming a part of this specification.

Referring to the drawing in which one complete method of carrying out the invention is shown for illustrative purposes:

Like numerals refer to like parts throughout the several views.

Figure 3:
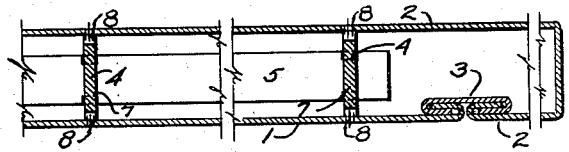
Fig. 3 is an enlarged horizontal sectional view at line B—B as indicated on Fig. 1.

In the embodiment of my invention shown in the drawing, 1 indicates the metal sheet on near side center, while 2 designates the metal sheet of the far side, which is returned at side edges to meet the metal sheet 1 on the near side and to engage with the continuous clips 3 which are slided in place from top at bottom of door before top and bottom channels 6 are placed.

At 4 the vertical ribs are shown, while 5 indicates the horizontal spacing bars adjacent top, bottom, and center of the door. The punched and expanded holes in ribs 4 are indicated at 7 while the spot welding projections are designated at 8. These holes 7 and projections 8 occur at proper intervals along each of ribs 4 as indicated by the asterisks which denote the spot welded points of connection between surface sheets 1 and 2 and ribs 4.

The spot welded points along both top and bottom edges of door are indicated by asterisks which in turn are designated by 9. These spot-welds connect metal sheets 1 and 2 to top and bottom channels 6.

Figure 1:
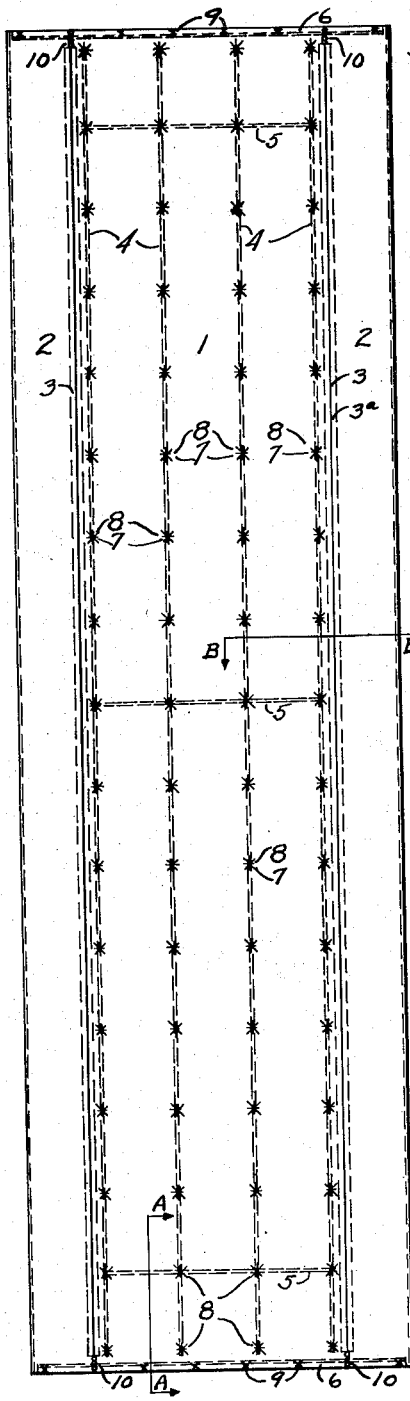
Fig. 1 is an elevation showing one side of a complete flush type hollow metal door embodying my invention.
Figure 2:
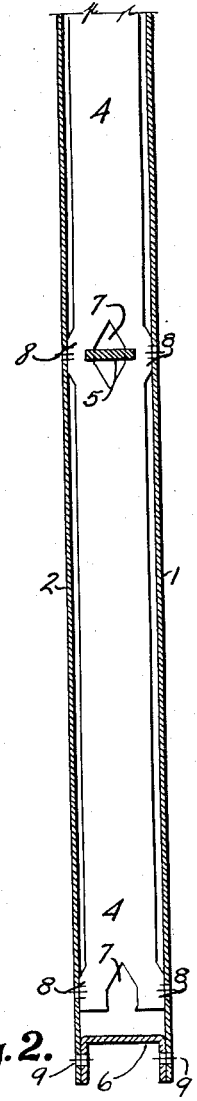
Fig. 2 is an enlarged vertical sectional view at line A—A through the lower portion of the door as indicated in Fig. 1.

The arc welded connections of metal sheets 1 and 2 are indicated adjacent top and bottom edges of the door on Fig. 1 at 10.

It will be observed that the spacing bars 5 are notched to a depth at each edge to leave a net width equal to the width of the punched and expanded holes 7 at all points of intersection with vertical ribs 4 and that during the assembly of said spacing bars 5 with vertical ribs 4 the spacing bars 5 are inserted through punched and expanded holes 7, in ribs 4, flatwise and then turned at right angles to complete the interlocking of the two series of bars, with the notches in spacing bars 5 engaging with and holding ribs 4 in accurately spaced positions.

When this operation is completed the whole grid formed by the said bars 5 and ribs 4 is inserted endwise between the metal sheets 1 and 2, positioned accurately, and then through-spotwelded in place at all expanded welding points 8 which occur at proper intervals along each edge of each vertical rib 4 to interior sides of metal sheets 1 and 2.

The end channels 6 at top and bottom of the door are also spotwelded to the interior surfaces of sheets 1 and 2 at welding points 9.

The seams between sheets 1 and 2 at each side, top and bottom, are arc welded together as indicated at 10 and then are ground off smooth as a final step in the fabrication of the door.

Figure 4:
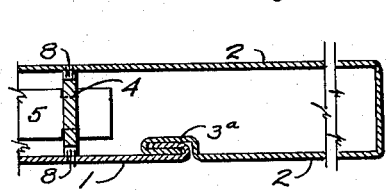
Fig. 4 is an enlarged view similar to Fig. 3 and shows another method of joining the surface metal of the door together.

In Fig. 4, the locked seam 3a is shown as an alternative connection between sheets 1 and 2, in place of the clip method shown at 3 in Fig. 3.

The invention may be carried out in other specific ways than those herein set forth without departing from the spirit and essential characteristics of the invention and the present embodiment is therefore to be considered in all respects as illustrative and not restrictive, and all changes coming within the meaning and equivalency range of the appended claims are intended to be embraced therein.

I claim:

1. A hollow metal door construction comprising: a main surface sheet which has both side edges returned in U-shapes and with both extreme returned edges again returned in shorter, narrower U-shapes, a supplementary surface sheet with each side edge being returned in narrow U-shapes and dimensioned to fit between the edges of the returned portions of the main surface sheet, a doubly returned U-clip that binds the main surface sheet and the supplementary surface sheet together continuously from a point near the bottom of the door to a point near the top end of the door in lines spaced from each side edge of the door on one surface, and vertically alined bars with spaced oppositely punch expanded points adapted for spotwelding to the interior surfaces of the main surface sheet and the supplementary surface sheet, with the aforesaid vertically alined bars spaced apart with interlocking cross bars.

2. A hollow metal door construction embodying two metal sheets, vertically alined bars with spaced oppositely punch expanded points adapted for contact welding to the interior surfaces of the said two metal sheets, and spaced apart at intervals with interlocking cross bars.

3. A door panel construction comprising: spaced-apart front and rear sheet-metal portions; spaced-apart bracing-ribs extending the main distance between opposite edges of the door panel and between the front and rear sheet-metal portions; each bracing-rib having two sets of spaced-apart projections; one set of projections being welded to the front sheet-metal portion and the other set of projections being welded to the rear sheet-metal portion; the portions of the surfaces of the bracing-ribs between the projections and nearest the sheet-metal portions being well spaced away from the latter.

4. A door panel construction comprising: spaced-apart front and rear sheet-metal portions; spaced-apart, flat-bar bracing-ribs extending the main distance between opposite edges of the door panel and between, and substantially at right angles to, the front and rear sheet-metal portions; each bracing-rib having two sets of spaced-apart projections; one set of projections being welded to the front sheet-metal portion and the other set of projections being welded to the rear sheet-metal portion; the portions of the edge-surfaces of the bracing-ribs between the projections and nearest the sheet-metal portions being well spaced away from the latter.

5. A door panel construction comprising: spaced-apart front and rear sheet-metal portions; spaced-apart, flat-bar bracing-ribs extending the main distance between opposite edges of the door panel and between, and substantially at right angles to, the front and rear sheet-metal portions; each bracing-rib having two sets of spaced-apart projections; one set of projections being welded to the front sheet-metal portion and the other set of projections being welded to the rear sheet-metal portion; the portions of the edge-surfaces of the bracing-ribs between the projections and nearest the sheet-metal portions being well spaced away from the latter; the bracing-ribs having spaced-apart sets of holes through which spacing-bars extend.

6. A door panel construction comprising: spaced-apart front and rear sheet-metal portions; spaced-apart, flat-bar bracing-ribs extending the main distance between opposite edges of the door panel and between, and substantially at right angles to, the front and rear sheet-metal portions; each bracing-rib having two sets of spaced-apart projections, the projections of one set being substantially opposite corresponding projections of the other set; one set of projections being welded to the front sheet-metal portion and the other set of projections being welded to the rear sheet-metal portion; the portions of the edge-surfaces of the bracing-ribs between the projections and nearest the sheet-metal portions being well spaced away from the latter.

7. A door panel construction comprising: spaced-apart metal sheets joined together along meeting edges extending the length of the door panel by juncture seams; a short portion of each of the opposite ends of each juncture seam being formed by welding the adjacent parts of adjoining metal sheets; and the intermediate portion of each juncture seam being formed by fold-locking the adjacent parts of adjoining metal sheets.

8. A door panel construction comprising: spaced-apart metal sheets joined together along meeting edges extending along one face of, and the length of the door panel by juncture seams; a short portion of each of the opposite ends of each juncture seam being formed by welding the adjacent parts of adjoining metal sheets; and the intermediate portion of each juncture seam being formed by fold-locking the adjacent parts of adjoining metal sheets.

HOWARD W. SCHWARTZ.